Dec. 4, 1934.  R. PEALE ET AL  1,983,487
PROCESS AND MECHANISM FOR SEPARATING INTERMIXED DIVIDED MATERIALS
Filed June 7, 1928   8 Sheets-Sheet 1

Dec. 4, 1934.  R. PEALE ET AL  1,983,487
PROCESS AND MECHANISM FOR SEPARATING INTERMIXED DIVIDED MATERIALS
Filed June 7, 1928  8 Sheets-Sheet 5

INVENTORS
Kenneth Davis
Richard Peale
BY John D Morgan
ATTORNEY

Dec. 4, 1934.    R. PEALE ET AL    1,983,487
PROCESS AND MECHANISM FOR SEPARATING INTERMIXED DIVIDED MATERIALS
Filed June 7, 1928    8 Sheets-Sheet 6

Dec. 4, 1934. R. PEALE ET AL 1,983,487
PROCESS AND MECHANISM FOR SEPARATING INTERMIXED DIVIDED MATERIALS
Filed June 7, 1928 8 Sheets-Sheet 7

INVENTORS.
Kenneth Davis
Rembrandt Peale
BY
John D. Morgan
ATTORNEY.

Fig 16

Patented Dec. 4, 1934

1,983,487

UNITED STATES PATENT OFFICE 1,983,487

PROCESS AND MECHANISM FOR SEPARATING INTERMIXED DIVIDED MATERIALS

Richard Peale, St. Benedict, and Kenneth Davis, Ebensburg, Pa., assignors, by mesne assignments, to Peale-Davis Company, Wilmington, Del., a corporation of Delaware Application June 7, 1928, Serial No. 283,600

26 Claims. (Cl. 209—467)

The invention relates to a new and useful process and mechanism for separating intermixed divided materials wherein the parts or particles vary relatively greatly in size and vary relatively very little in their specific gravities.

Objects and advantages of the invention will be set forth in part hereinafter, and in part will be obvious herefrom, or may be learned by practicing the invention; such objects and advantages being realized and attained by the steps and through the instrumentalities pointed out in the appended claims.

The invention consists in the steps, processes, parts, combinations, improvements, constructions and arrangements herein shown and described.

The accompanying drawings, herein referred to and constituting a part hereof, illustrate one embodiment of the invention and the preferred manner of practicing the same, said drawings together with a description serving to illustrate the principles of the invention.

The invention pertains broadly to the separation of intermixed, divided materials, the term "divided" being used to designate broken, fragmentary, granular, pulverulent or other materials comprising separated parts or pieces of different kinds of material. The invention in its novel features is more particularly directed, however, to effecting automatic separation to practically the ultimate degree of possible efficiency, of such mixtures of materials wherein the various pieces of the different kinds of materials vary relatively very greatly in size, while varying relatively little in their specific gravities. With this purpose in view, the invention is further particularly directed to special treatment of the intermixed materials during, and as a part of, the separating process by effecting concurrently an approximate size classification, especially of the impurities, whereby there is attained unusual, and practically perfect, efficiency in cleaning and separating such widely varying unsized materials, through even the finest intermixed dust, and likewise through "fines" carrying relatively very great percentages of impurities. More particularly, the finer portions of both the heavier and lighter materials are prevented from remixing after an initial stratification during the principal separating process, and according to one feature of the invention, the finer parts of both the lighter and heavier materials are subjected to a supplementary separating operation, which may be minutely controlled and regulated both as to kinds and quantities of materials so operated on in the supplementary separation.

The conditions of the inventive problem solved by the invention are of the greatest practical difficulty, due to the wide range of variations in the sizes of the pieces or particles of the intermixed materials, and concurrently therewith the relatively small differences in the specific gravities of the materials, and due further, frequently, to a very high percentage of impurities in the finer part of the mixture. Separating work of this kind, with these factors present, requires practically an entirely different process and mechanism or apparatus from the separation of materials which are very finely pulverized and which vary very widely in their specific gravities on the one hand, or which, on the other hand, are very carefully and extensively sized prior to the separating process.

One kind of intermixed divided materials which the invention is especially capacitated to successfully separate, is a mixture of coal, "bony" and rock, with the other impurites usually present in the coal, as it comes from the mine, that is, "run of the mine" coal, except that the large lumps, say from three inches up are crushed. The rock and other impurities are separated from the "run of mine" coal by the present invention entirely automatically, on a single cleaning table, and without previous sizing of the materials, except as to said crushing or removing the very largest lumps, the practically perfect separation being effected down through the finest dust of the intermixed materials.

The terms "lighter" and "heavier" as used hereinafter will be understood as applying to the specific gravities of the various intermixed, divided materials and not to the difference in mass of particular pieces of various sizes.

The present invention as preferably practiced comprises feeding the unsized run of the mine coal onto an air-pervious table or deck at a regulable rate, so as to maintain substantially uniformly upon the table a bed of the materials of appreciable thickness, usually several inches in thickness. This bed is progressed forwardly and simultaneously undergoes gradual separation into horizontally-disposed strata, the superior one of clean coal, and the inferior one of the impurities, by reason of the longitudinal reciprocation of the bed and forcing upwardly through the bed lifting air currents. The coal, as the lighter material, is floated in a superior stratum and the impurities, as the heavier material, comes to rest upon the table, and are thence impelled forwardly by friction and inertia to discharge along a predetermined path. This latter function is partly effected by particular arrangements of separating partitions upon the air-pervious table or deck.

By the concurrent size classification of the settled or settling rock and other impurities, effected by the present invention, the finer portion of the impurities are directed immediately from the bed by a very short and direct route, and delivered at, and discharged from, the nearest side edge of the bed, while the coarser particles of the settled rock and other impurities are likewise impelled from the bed by a different but likewise very short and direct route, and are preferably discharged from the opposite side edge of the bed. This function is facilitated by maintaining a transverse inclination of the bed of materials undergoing separation, the short route to discharge of the "fines" of the impurities being in a downwardly and forwardly transverse direction to the near side edge of the bed and thus to discharge, and the path of the coarser impurities being transversely and forwardly in an upward direction to discharge at the opposite side edge of the bed. In connection with the foregoing, there is special air current treatment of the "fines," subsequent to the primary separating operation.

In view of the great difficulty of securing practically perfect cleaning of the fines, and especially in view of the fact that the fines of many mine coals are relatively very dirty, the invention provides further, as an optional addition, for a final and supplementary cleaning of substantially all of the fines of both the coal and the impurities combined, or of predeterminable or selected parts thereof, with means, accordingly, for regulating the proportion or size of the "fines," especially of the impurities, which shall be subjected to this supplementary treatment or retreatment. With certain kinds and conditions of materials to be separated, the present invention is of very great efficiency, as for example, with highly bituminous coking coals, and those having very impure fines, the process of the present invention being efficient to clean such coals substantially to the maximum of the theoretical washability curve of the particular coal.

The present preferred embodiment of apparatus or mechanical means for practicing the invention, broadly considered, comprises an air-pervious table or deck, which is inclined both transversely, and forwardly and upwardly, and is longitudinally reciprocable through a very short path, the table being relatively long and narrow. The intermixed materials are regularly fed onto the rear end of the table, so as to maintain a bed of materials over the entire extent of the table of a substantially desired predetermined thickness, the separation being effected through the stratification of the coal into a horizontal stratum flotant upon the lifting air forced through the table or deck, the heavier impurities settling upon the table. The settled impurities, resting upon the table or deck, are impelled from the bed by friction and inertia, due jointly to the reciprocatory movement of the table and the directive action of the separating partitions.

These separating partitions are preferably parallelly arranged, and are formed in pairs, specially in the forward part of the table, and are forwardly and outwardly inclined from their common point or juncture, toward both side edges of the table, the separating partitions on the lower side of the table being much shorter than those on the upper side. The separated impurities of smaller size, that is, the "fines", tend to settle upon the lower part, that is, near and along the lower side edge of the table, and this gives a very short path to delivery and discharge for these finer impurities, while likewise providing an upwardly-directed and still very short path to discharge for the coarser impurities. This effects the size classification, automatically and as a part of the separating process, of the impurities, which obviates a remixing thereof with the other materials, as might occur if the impure "fines" remained upon and travelled along the table diagonally across its entire breadth.

The zoning as to air-perviosity of the table or deck, is such as to provide for a relatively small degree of air-perviosity along the area of settlement and travel to discharge of the "fines" of the impurities. The flotant superior stratum of coal is caused to flow freely and unrestrictedly forwardly, and to discharge at the front end of the table over a relatively extensive spillage edge, which is created by the front of the table being diagonally disposed at a relatively long angle to the sides thereof.

Apparatus or mechanism is further provided by the invention, for the purpose of overcoming any difficulty due to the relatively great proportion of impurities in the "fines" of many varieties of coal. Said mechanism provides for taking the "fines" of the coal from along the spillage edge, and also the "fines" of the impurities from along the lower edge of the bed, and delivers these to a retreatment table to be subjected to a supplementary separating and stratifying process, whereby these "fines" are practically as completely cleaned as the great bulk and coarser part of the materials was upon the main table. By regulating the separate discharge of the fines of the coal and the discharge of the finer impurities through the discharge boxes along the lower side edge of the bed, the relative size and quantity of these which are directed to the retreatment table for the supplementary separation process may be predetermined to any degree required.

It will be understood that the preceding general description and the following detailed description are exemplary and explanatory of the invention, but are not restrictive thereof.

Referring now in detail to the embodiment of the invention illustrated by way of example in the accompanying drawings, an air-pervious table or deck 1 is provided, which is rendered air-pervious in any suitable way, and may consist of perforated metal sheets, the relative areas of the perforations and the solid portions determining the degree or air-perviosity and variations made in these relative areas affording means for zoning or varying the degree of air-perviosity in different parts of the table. The table is preferably of rectangular form and relatively long and narrow, except that the spillage edge for the coal at the front of the table is transversely disposed, at a relatively long angle with respect to the body of the table. Retaining walls for holding the bed of materials upon the table are provided, comprising a transverse bed-retaining wall 2 at the rear end of the table and bed-retaining walls 3 and 4 extending along either side thereof.

The table is mounted for longitudinal reciprocation, through a very short path, over a stationary air chamber from which are supplied the air currents which are forced through the bed. As embodied, the walls 2, 3 and 4 extend downwardly below the table, and are attached on their outer sides to a supporting frame 11. This frame 11 consists of angle beams fastened together at the corners of the table structure. The deck 1 is supported by means of a frame 12 of fixed angle beams on the inner side thereof carrying a series of supporting beams 13 upon which the deck 1 rests. These supporting beams 13 likewise comprise a part of the air current control system as will be later described.

The means for reciprocably mounting the table upon the stationary air chamber, as embodied, comprises a plurality of supporting arms 19, arranged at intervals along either side of the supporting frame 11 of the reciprocable table, these arms 19 being pivotally connected at 20 to the frame 11, and at their lower ends arms 19 are pivotally mounted in blocks 22, fixed on the upper side of the longitudinally disposed side members 23 of the top frame of the air chamber proper. The air chamber is non-reciprocable, but is longitudinally variably inclinable together with the table itself as will be later described. The pivotally connected supporting arms 19 are upwardly and backwardly inclined whereby the short reciprocable movement of the table is upwardly and forwardly and downwardly and rearwardly. In addition, the movement of the table is relatively slow upwardly and forwardly and relatively quick backwardly and downwardly.

The means for effecting the reciprocatory movement of the table may be of any known or suitable form. As embodied, a connecting rod or link 33 is connected to the rear end of the table frame 11, and is also connected to an eccentric 34, which is fixed on a shaft 35, mounted in bearings 36, the shaft being driven in any suitable manner. Resilient cooperating means are provided, and as embodied, a plurality of rods 39 project forwardly from the front end of the table frame 11, and are reciprocable in apertures formed in a cross-plate 40 mounted on the stationary frame of the air chamber. Helical springs 41 are arranged about rods 39, and are in compression between the plate 40 and washers 42 fixed on the front end of the rods 39, thereby affording a resilient action as the table is reciprocated.

As indicated, in the present exemplary embodiment the non-reciprocable air chamber is tiltable with the reciprocable table, to impart variable longtiudinal inclination to the table. Accordingly, the top frame 23 of the air chamber has forked blocks 24 fixed to the underside of the side reaches of the frame in spaced-apart relation, and pivotally connected thereto at 25 are downwardly-extending screw rods 26. These screw-rods 26 have a loose fit in blocks 27, which are pivotally mounted in forked supports 28 which are fixed on supporting pillars 29. Nuts 30 are screw-threaded on rods 26 and rest on the top of the pivoted blocks 27. By turning these nuts at the various points along both sides of the structure, the longitudinal inclination of the table may be varied as desired.

The embodied form of means for providing the lifting air currents and for forcing them through the bed, comprises a stationary air chamber 61, which is supported on a frame of I-beams 23. The air chamber is preferably formed decreasing taperingly forwardly in cross-section, so as to maintain the air current force of practically uniform intensity throughout the length of the table. The areal regulation of the air current force is effected by the zoning of the deck, and other controlling means later to be described. The stationary air chamber and the reciprocable table are connected together by a flexible air-impervious member such as a canvas juncture 63.

The air currents may be provided from any suitable means, such as a rotary fan (not shown) which supplies the air current through a duct 64 communicating into the rear end of the stationary air chamber, to which it is connected by a flexible air-tight member 65, to permit of the angular movement of the air chamber in regulating the longitudinal inclination of the table as already described. The lifting air current forced through the bed of materials may be either steady or pulsating, so far as concerns the main features of the present invention, and as embodied, means are provided for creating a pulsating air current, which may be used or may be optionally rendered silent in particular cases, as may be found desirable or most efficient. As embodied, a rotary shutter or butterfly valve 67 is mounted within the duct 64, on a transversely-disposed shaft 68, which is journaled in the side walls of the air duct 64. The regulating shutter 67 may be operated in any manner desired, as by means of a driving pulley 69, fixed on the shaft 68, and driven in any suitable manner, as by a belt 70. This may be driven or controlled by any known or other suitable variable-speed device if desired, to produce the pulsating lifting air action through the bed; or the shutter 67 may be held stationary, in horizontal position, thereby permitting a continuous or non-pulsating lifting air current action through the bed. It will usually be found most efficient to time the rotation of the controlling shutter 67 with the reciprocatory movement of the table, by effecting a half-rotation of the shutter for each complete reciprocatory movement of the table. With many kinds of materials to be separated, the pulsating air blast will be timed so that the shutter will begin to open and go to horizontal or full open position on the forward stroke of the table, and will then go to the closed position, at the half revolution on the backward or return stroke of the table. This will prevent any backward sucking on the return stroke of the table and will secure the full separating effect of the pulsating air blast.

The embodied form of means for transversely varying the inclination of the table comprises a pair of longitudinally-extending angle beams or strips 71 and 72, along either side of the table, which strips are fastened to the outer side of the downwardly-extending parts of the side walls 3 and 4. The horizontal flange of angle strip 71, along the lower side of the table, rests upon the vertical edge of the reversely positioned angle beam 11 of the reciprocable frame, this structure acting as a hinged support. On the opposite or upper side of the table, a plurality of upwardly projecting screw-threaded rods 73 are fixed in longitudinally spaced-apart relation in the angle beam 11 of the frame. Screw rods 73 are fixed in place in suitable manner, as by nuts 74 and 75 threaded onto the rod and screwed up on either side of the horizontal flange of the beam 11. These rods also project through relatively large apertures in the horizontal flange of the longitudinally-disposed angle strip 72, which is fixed to the side of the table, and there are nuts 76 and 77 on either side of said flange. By turning these nuts 76 and 77, the table may be lowered or lifted at this side if desired, and the bed be variably positioned from horizontal to a relatively steep angle of transverse inclination.

Figure 1:
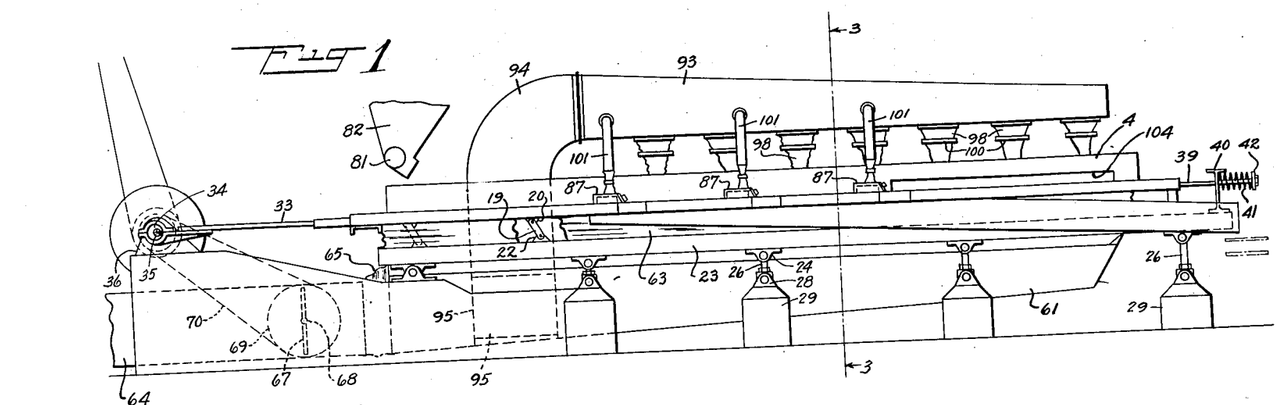
Fig. 1 is a side elevation of a mechanism embodying my invention.
Figure 2:
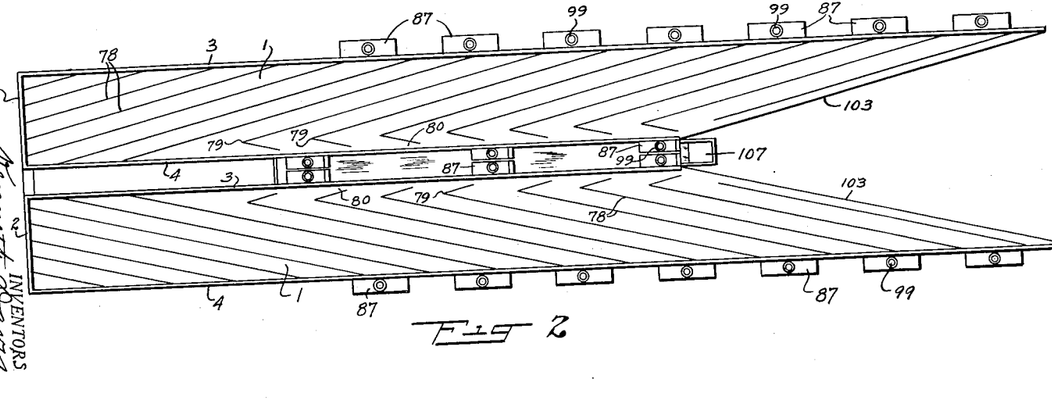
Fig. 2 is a top plan, partly diagrammatic, of a double table embodying the invention.

In the present preferred arrangement of the separating partitions upon the face of the air-pervious table, those at the rear of the table begin at the rear bed-retaining wall 2 and at the side bed-retaining wall 4, and are inclined forwardly and outwardly, that is, toward the longer side of the table, as shown in Fig. 2, terminating at or near the side bed-retaining wall 3. These separating partitions 78 are preferably of the form shown in Fig. 10, that is, the outer end is beveled at a greater or less angle as may be found desirable. The beveling of the outer ends of the separating partitions provides a limited and partially unobstructed passageway along the retaining wall 3 for the settled heavier particles deposited there so that these particles may more easily find their way to the spaced-apart refuse discharge outlets along the wall 3. Beginning at a point some distance away from the rear end of the table, the separating partitions are of duplex form, that is, a pair of separating partitions are inclined forwardly and outwardly, divergently from each other, and from a common point or juncture 79 toward either side of the table, and thus of the bed of materials thereon. In accordance with one feature of the invention, one separating partition of these duplex pairs is much shorter than the other and the point of juncture is much nearer one of the side edges of the table than the other. This construction is of especial advantage in connection with the transversely-inclined bed, the shorter separating partition of each pair being on the lower side of the bed. Preferably also these shorter partitions terminate short of the side wall 4, leaving a relatively narrow, longitudinally-disposed channel 80 upon the table within and along the side wall. The preferable arrangement of the lifting air current intensities in connection with this arrangement of separating partitions will be later described.

Means are provided for feeding the intermixed materials to the rear end of the table at variable speeds, so as to maintain upon a table a forwardly-moving bed of materials of the desired thickness undergoing separation. This material-feeding mechanism may be of any known or other suitable form, and is represented generally as comprising a hopper 82, having a variable-speed feeding device 81. This mechanism may be the same as that shown in copending application Ser. No. 190,925 of Kenneth Davis, filed May 12, 1927.

Means are preferably provided for removing from the table and discharging the impurities which have settled from the bed upon the table and have been impelled to the side edges, as already described. There are preferably a plurality of these discharge devices arranged in spaced-apart relation at either side of the table. These devices may be of the same general form and construction and manner of operation as those disclosed in said copending application Ser. No. 190,925, and they are accordingly so shown. As so embodied, said devices comprise a plurality of air chutes or air boxes 87 fixed to the outside of the outer bed-retaining wall 3, and having an aperture or discharge opening 84 (Fig. 3) through the side wall. These apertures are preferably provided with one or more movable slides 85 by which the area of the discharge opening 84 may be varied, or a particular discharge air box, at any point along the bed, may be closed and rendered inoperative. These air boxes are preferably provided with hinged discharge-regulating gates 88, upon which are hung variable weights 89, for the purpose of regulating the discharge pressure. Thus, during the separating operation, as the impurities accumulate and are impelled outwardly, directed by the separating partitions, they will pass into the nearest discharge box 87, and the discharge of the impurities from the box, at the end of the forward stroke of the table, may be regulated by varying the weights 89 upon the hinged door 88 at the exit from the box.

Means are provided for supplying a backward blast of air from the discharge box into the bed of materials to prevent the entrance or intermixture of any of the upper flotant layer of coal. In the embodied form of said means, an air-current conveying header 93 is arranged above and along the side of the table, this header preferably decreasing in cross-section forwardly in order to maintain a practically uniform air current pressure throughout its length. This header is supplied with air current from the fan by means of a pipe 94, which connects with an opening 95 in the side wall of the stationary air chamber. A pivoted, variably-positionable vane or deflector plate 96 is provided for regulating the amount of air current diverted from the air chamber into the header 93. Pipe 94 has a flexible section 92 to provide for the relative motion between the table and air chamber. Openings 97 from the header 93 communicate by flexible air-impervious ducts 98 with corresponding openings 99 in the top of the respective discharge boxes 87. The amount of air current passing through any of the ducts 98 may be regulated by any suitable means, such as a strap 100 arranged about the duct and capable of being drawn up or let out as might be required. Similar discharge boxes, but of smaller size, are provided upon the other side of the table 1, and similar reference numerals are applied thereto. These are supplied by means of air pipes 101 branching from the header 93. With these discharge devices also, the slides 85 may be variably positioned to regulate the amount of rock and other impurities passing therethrough, or any slide 85 might be closed to shut off the discharging material through the particular discharge chute. By means of these slides 85 the amount or proportion of impure "fines" to be directed along the channel 80 to be subjected to a retreatment process may be accurately regulated.

Figure 3:
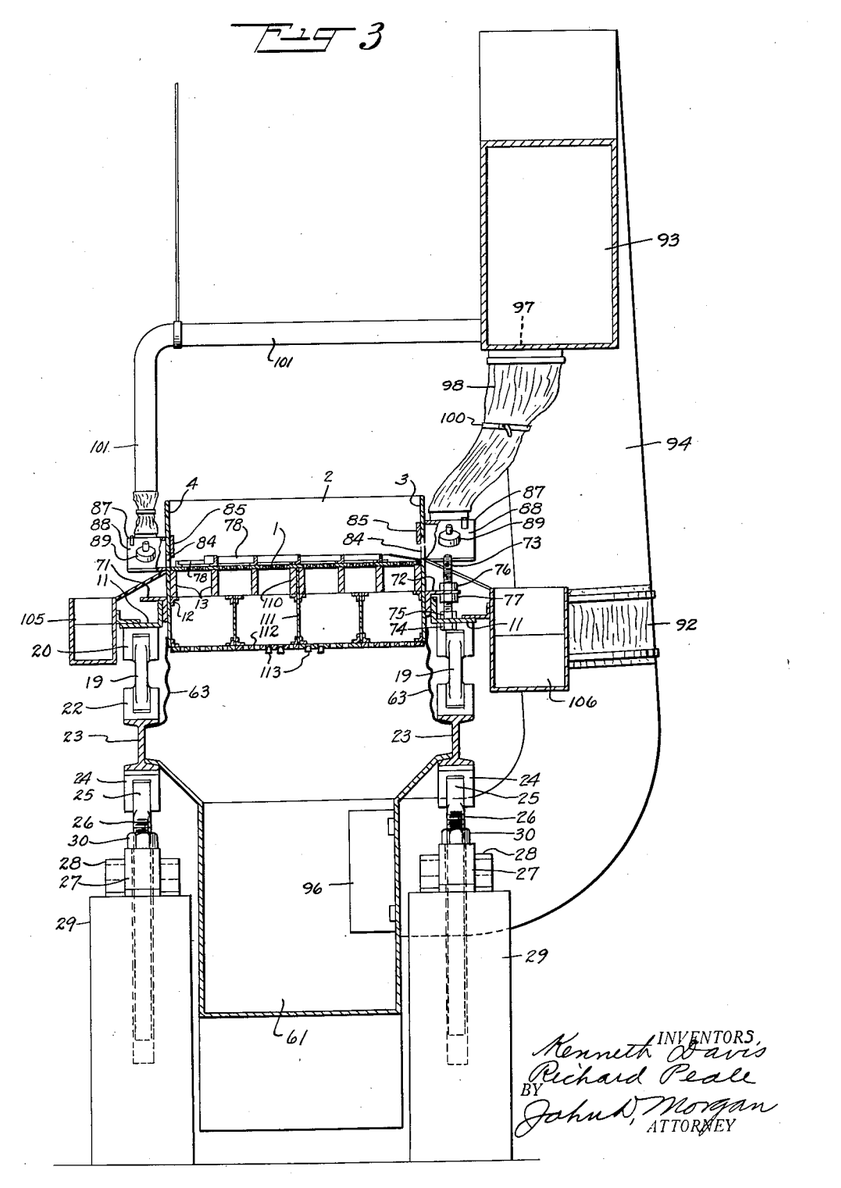
Fig. 3 is a vertical transverse section of the lines 3—3 of Fig. 1.
Figures 4, 6, 12:
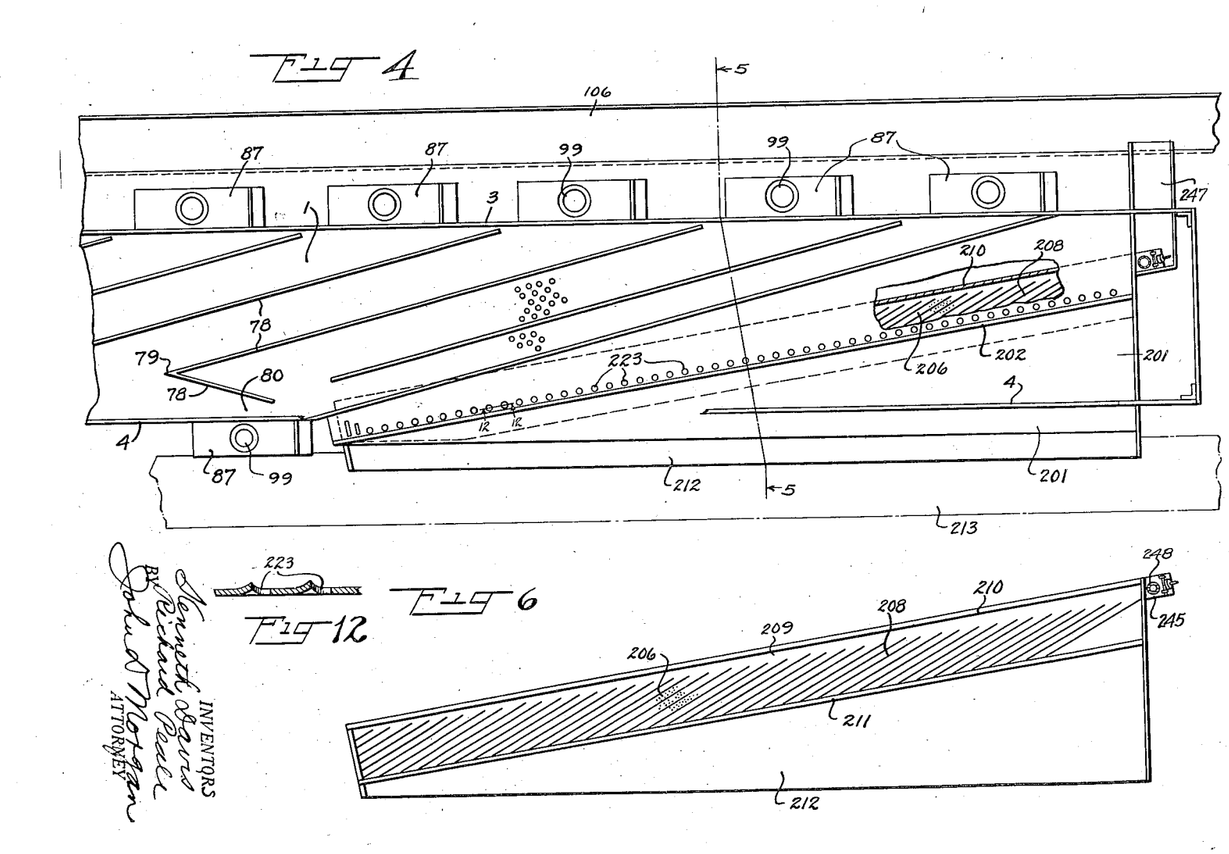
Fig. 4 is an enlarged fragmentary top plan of the forward end of a table embodying also the retreatment table for the fines only.
Fig. 6 is a top plan, partly diagrammatic, of the retreatment table for the fines.
Fig. 12 is a fragmentary detail section of one of the discharge holes for the "fines"

In the present form of apparatus for carrying out the invention, the superior separated stratum of clean coal travels unrestrainedly forwardly and is discharged at the front end of the table, and preferably for the full width of the table. To provide an adequate and ample spillage edge 103, the front edge of the table is disposed diagonally across the table, and preferably at a relatively small angle with the outer side edge of the table. As a matter of convenience of structure, bed-retaining wall 4 extends forwardly past the corresponding front corner of the table and an opening 104 is made for the passage of the stream of clean coal to discharge over a suitable shelf or chute. Suitable chutes for the discharged coal and rock are provided, of any suitable form; rock chutes 105 and 106 are shown in Figs. 3 and 4. The center fines discharge in Fig. 2 is by a chute 107.

Figures 8, 10:
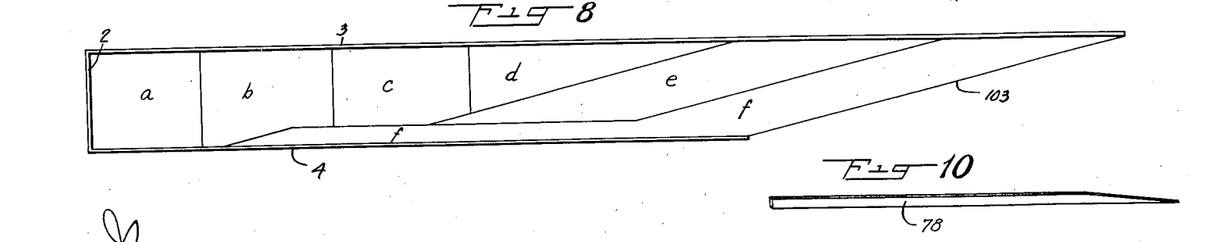
Fig. 8 is a diagrammatic plan of a table showing one system of air-perviosity zoning.
Fig. 10 is a detail of a separating partition.
Figure 9:
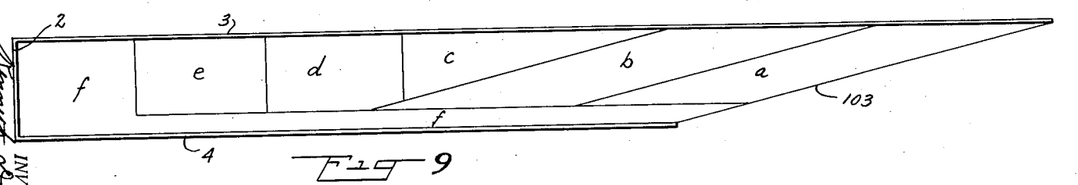
Fig. 9 is a diagrammatic plan showing another system of air-perviosity zoning.
Figure 11:
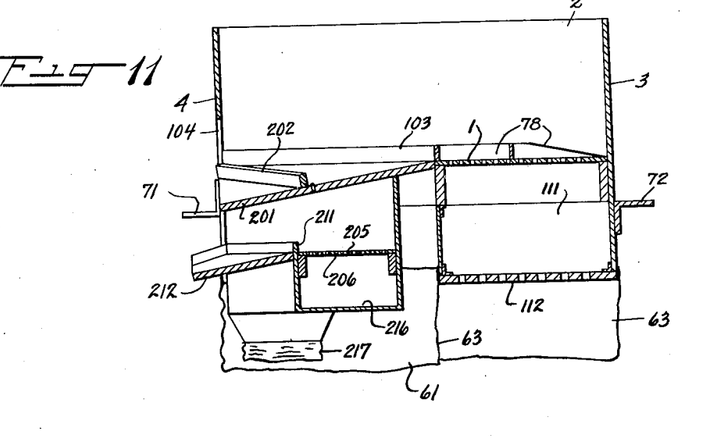
Fig. 11 corresponds to the upper part of Fig. 5, showing sharply sloping discharge plates.

So far as concerns most features of the invention, the zoning of the air currents, that is, the variation in air-perviosity of the deck, may be variously arranged. In Fig. 8, the air current area or zone of greatest perviosity or intensity is at the rear of the table, the intensity decreasing forwardly as indicated by the letters *a* to *f*. In Fig. 9, the air zoning is in the main the reverse of that shown in Fig. 8, although it will be understood that the actual air zoning used in particular instances may be different from that shown in either of these figures. Preferably, however, according to the present invention, there is a zone or area of low air intensity or perviosity along the area occupied by the shorter separating partition at the lower side of the transversely-inclined table and along the channel 80. This gives a relatively low or mild air-lifting action in the area where the fines of the refuse settle and are impelled along the table toward discharge. If desired, the lightest air intensity may be in the median zones; or if desired, the air intensity may be uniform through all or most all of the table.

The relative air-perviosity of the deck 1 may be further regulated by means similar to that described in copending application Ser. No. 200,080 of Kenneth Davis, filed June 20, 1927 now Patent No. 1,923,917. Such a construction is shown generally in Fig. 3, with the sub-areal chambers formed by walls 110 and 111 and floor 112, and with air regulating openings and stoppers 113.

In the operation of the hereinbefore-described mechanism, the table may be regarded as having thereon a bed of the intermixed materials, such as run of the mine coal undergoing separation. The table is reciprocated through a short path, preferably with a slow rising forward motion and a quick descending rearward motion, the lifting air currents being forced upwardly through all parts of the bed with intensities dependent upon the degree of air-perviosity of the bed and the setting or regulation of the other air intensity controlling devices. The lifting air current at the rear end of the table separates and loosens the particles or pieces of material, and the coal or other lighter material is buoyed or lifted upwardly into a superior horizontally-disposed stratum and the rock and other impurities settle upon the table, and thereafter are forwarded by friction and inertia to a place of discharge. The stratifying and separating operation continues in like manner forwardly along the table as the bed progresses from the rear toward the front.

When the bed is transversely inclined, the shorter side of the table being the lower, and the longer side the upper, the tendency is for the finer material to move toward the lower side of the bed and for the coarser material to move toward the upper side of the bed. As a result, the finer impurities settle along the lower side, extending forwardly, and the coarser impurities settle toward the upper side and along the bed. With the form of separating partitions shown, from a point well back on the table, the coarser impurities, due to the reciprocation of the table and the direction of the separating partitions, are impelled forwardly and upwardly and by a relatively short route to the upper side edge of the bed and are there discharged through the discharge air boxes 87. As hereinbefore stated, the amount of material discharged through each of these boxes may be regulated as desired, and the box may be set so that none or practically none of the coal will pass into the box; any stray particles of coal which do so will be blown back into the bed by the air blast entering the bed from the particular discharge box.

Figure 7:
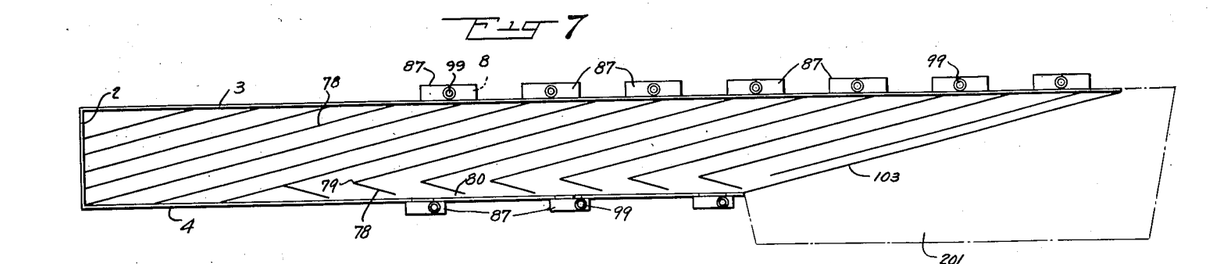
Fig. 7 is a diagrammatic plan of a single table showing the preferred arrangement of separating partitions.

The finer settled impurities are impelled by the shorter separating partitions toward the lower side of the bed, and thus pass by an exceedingly short and direct route out of the bed of materials. In addition, the settled finer refuse is thus prevented from travelling a long distance over the table and in the bottom of the bed with the consequent danger of the finer particles being again blown upward by the lifting air currents and again intermixed with the bed. This immediate and automatic size classification of the separated and settled refuse, occurring concurrently with and as a part of the separating process, renders it possible to apply a special air current intensity treatment to these finer impurities, notwithstanding that they settled upon different parts of the table. This is effected by a special air-zoning or regulation in connection with the area of the short separating partitions and collected "fines" of the refuse, as will be seen from Figs. 7, 8 and 9. This process and construction also provides or permits a separate regulation of the discharge of the now segregated fines of the refuse, as the air-discharge boxes 87 on this side of the table may have their regulating slides 85 set or positioned especially for regulating merely these "fines" of the refuse, as these alone come to these particular air boxes. Furthermore, the discharge through the fines air-boxes 87, may be regulated so that any desired proportion of these finer impurities may be directed forwardly through the channel 80, just within the bed-retaining wall 4, and discharge at the forward end of the table, for further treatment, as is later described. The superior stratum of clean coal flows unrestrainedly forwardly along the table, and is discharged over the full width of the table, and along the entire extended spillage edge into a chute and is conveyed away and usually delivered into the railway cars. An automatic and concurrent classification of the fines from the coal, and retreatment thereof, if desired, is also later described.

Figure 5:
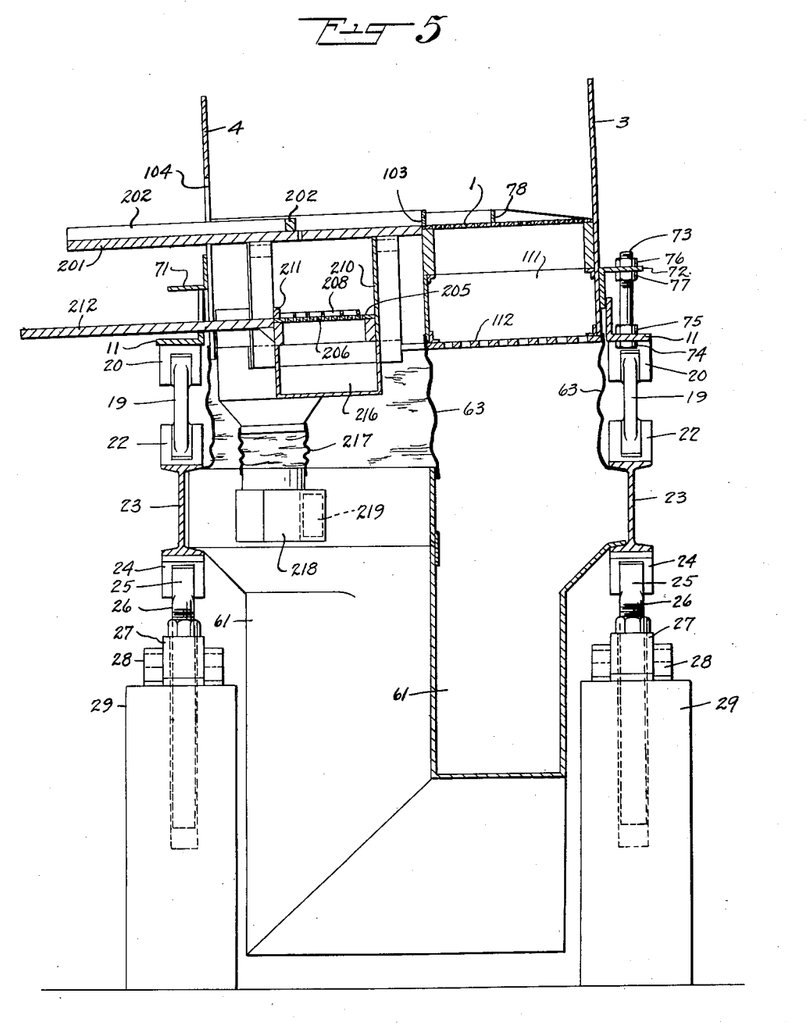
Fig. 5 is a transverse vertical section on the line 5—5 of Fig. 4.

Referring now to those features of the invention relating to a supplemental separating and retreatment or purifying operation upon the "fines" of either the coal or of the impurities, or of both, the present preferred form of means for effecting this is exemplarily shown in Figs. 4, 5 and 6 of the drawings. Means are provided whereby a residual of the "fines" of the coal is kept from delivery with the bulk and coarser part of the coal, and this residual of fines is delivered, or not, at option to the retreatment process. As embodied, a spillage plate 201 is provided at the forward edge 103, or corresponding part of the table, as plate 201 may be flush with the table if desired, and preferably a fines-collecting strip 202 (Figs. 4 and 5) arranged along this edge, whereby a slight layer of the material reaching the spillage edge is retained upon the table, this layer consisting of the fines or extreme fines of the coal. A small retreatment table 205 (Figs. 4, 5 and 6), having an air-pervious deck 206 is mounted and positioned transversely beneath and along the front end of the table, and in alinement with the fines-collecting strip 202. This retreatment table 205 may be of various forms, broadly considered, but is preferably provided with separating partitions 208, which are forwardly and outwardly inclined, and providing a channel 209 for the separated refuse along the side wall 210 of the table. The outer or lower edge of the table is provided with a low wall or spillage strip 211, over which a superior stratum of the fine coal separated from the fines of the impurities on this table is delivered onto a spillage plate 212. The clean coal discharged from the spillage plate 201 and that discharged from the spillage plate 212 are both then discharged onto a conveyor belt 213 and conveyed away together. The air currents which are forced through the bed of fines upon table 205 will, of course, be of relatively very low intensity, and this may be governed entirely or largely through the degree or zoned degrees of air-perviosity of the table 205. As embodied (Fig. 5), an auxiliary air chamber 216 is provided beneath the table 205, and this communicates by a flexible conduit 217 with a conduit 218 fixed to and projecting from the transversely disposed forward part of the stationary air chamber. One or more slides 219 may be provided in the conduit 218 to regulate the flow of the air currents from the air chamber, and these devices may cooperate in regulating the intensity of the air currents through the table 205.

Means are provided for regulating the kind and quantity of fines, that is, whether fines of coal or of impurities, or of both, and the proportion and relative sizes of each or both, which are fed to the retreatment table 205 for the supplementary separating operation. This is effected in part by regulating the slides 85 on the lower side of the table. It may also be effected by regulating the height of the fines retaining strip 202. As a further, and cooperating means, a plurality of apertures 223 are formed in the main table or deck 1, just within the retaining strip 202, and in transverse alinement with opening 104 in side wall 4, through which the residual fines may sift or pour down upon the retreatment table 205; said apertures thus serving as a screen to remove the coarser pieces of coal from the residual intermixture of fine coal and impurities. One or more of the rearmost of the apertures 223 are preferably of relatively large size, and through these the bulk of the impure fines which are turned from the discharge boxes 87 into channel 80, and thus designed for retreatment may be delivered to the retreatment table. The upper part of side wall 4 is broken away in Fig. 4 to show opening 104. By stopping or leaving open any of the apertures 223, the kind and quantity of fines delivered to the retreatment table may be regulated. The other means which may also optionally contribute to this function may be regulated.

Figure 13:
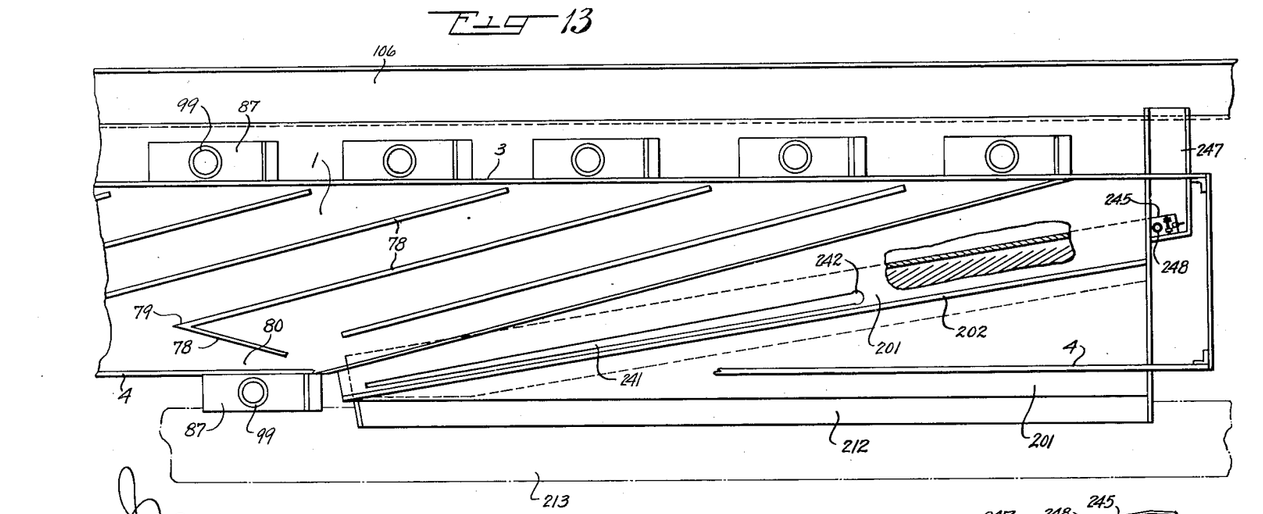
Fig. 13 is a modified fragmentary top plan corresponding to Fig. 4.
Figure 14:
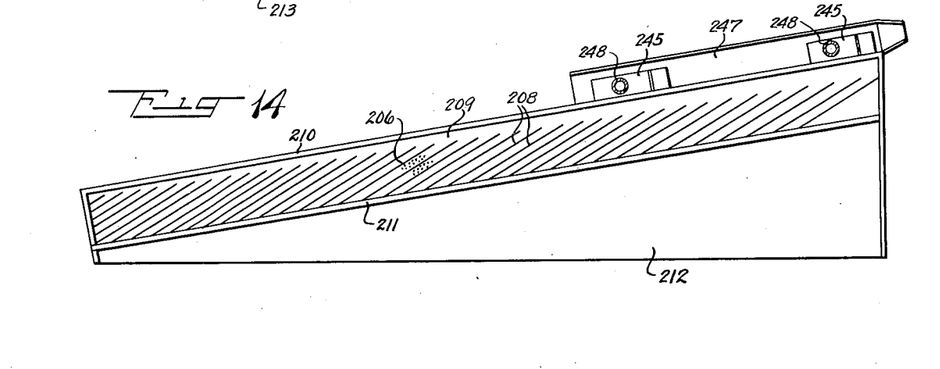
Fig. 14 is a modified form corresponding to Fig. 6.

In Figs. 13 and 14 a modified form of the sub-deck or supplementary treatment table is shown, and also of the means for selectively feeding thereto the "fines" of either the coal or refuse, or of both. In Figs. 13 and 14 the form of means for feeding the "fines" from the main table or deck to the sub-deck comprises a relatively long and narrow slot 241, formed in the discharge plate 201, and located just within the fines collecting strip 202. The slot 241 is preferably arranged parallel to the fines collecting strip 202, and preferably widens in the forward direction. To prevent locking of relatively large pieces of material in the slot, and thereby gradually choking it, it is provided at its forward end with an enlargement 242, whereby a piece of material lodging in the slot and too large to pass therethrough, would gradually pass out at the forward end and thus choking of the slot is avoided.

The sub-deck 206 in Fig. 14 is shown of substantially the same form as in Fig. 6. However, in Fig. 6, a refuse-discharge box 245 is shown at the forward end of the sub-deck, and in line with the forward end of the refuse channel 209, when this channel is employed. In Fig. 14 two refuse-discharging boxes 245 are shown in spaced-apart relation located along the forward side edge of the sub-deck. In many instances the refuse-discharging boxes for the sub-deck may be dispensed with entirely. The refuse-discharging boxes empty into a conveying chute 247, which discharges into the refuse chute 106. The refuse-discharging boxes may be of the same general construction as those of the main deck, and are preferably supplied with air-blast conduits 248. The clean "fines" are discharged over the spillage edge 212, onto the endless belt conveyor 213, which conveys away all of the clean coal.

Figure 16:
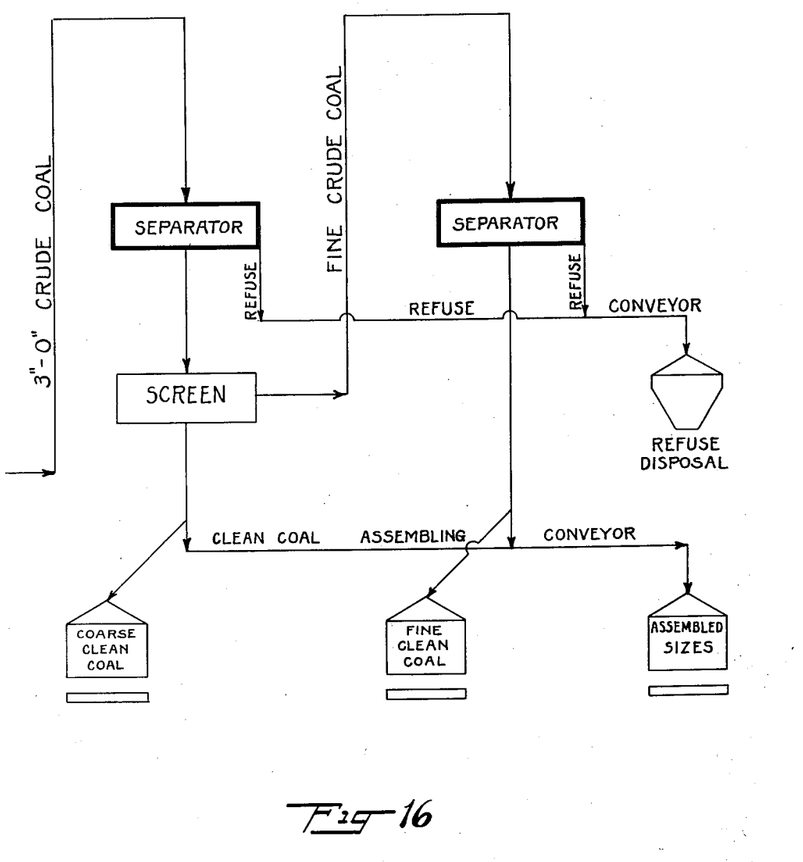
Fig. 16 is a flow diagram showing the process embodying the invention.

The flow diagram of Fig. 16 illustrates the principal steps of the process in a clarified manner apart from the present embodied mechanism, or any mechanism used in carrying out the process. To correlate the diagrammed process steps of this figure with the corresponding parts of the embodied mechanism for carrying out the process, the reference numerals of some of the mechanism parts are applied in the following description to the corresponding parts or indications of the diagram. As shown in said diagram, the unsized impure, crude or raw coal, say of a size range from 3" to 0", is supplied to maintain the primary bed undergoing pneumatic separation and stratification on the "separator" (1). As previously described, the separating action in the bed (1) is controlled to effect a settling out and subsequent discharge of practically all the coarser refuse through the boxes (87) and into the refuse conveying means (106) which conveys the refuse to final disposal at the refuse bin or dump. The remainder of the original crude coal, comprising the full size range of coal and finer sizes of refuse in intermixture, passes through the "screen" (223) and here the coarser coal, which has been purified on the separator (1) passes over the screen and is discharged by conveying means (201) as clean coal. The still intermixed fine coal and refuse passes through the screen (223) to the second separator (205), and there it is subjected to the additional or supplementary separating or purifying action. All of the fine refuse settles out on this retreatment separator and is conveyed away by chute (247), joining with the coarse refuse from the first separator on the way to the rock pile. The fine coal is carried away from this second separator by the conveying means (212), joins the coarse clean coal from the screen and all the clean coal is delivered by the conveyor (213) to the railway cars or other receptacles.

In accordance with certain features of the invention, there is effected a concurrent process of both cleaning and sizing the unsized coal, or equivalent lighter upper stratum of material. During the separating operation, and concurrently with the stratification, separation and cleaning of the impurities out of the coal, the coal is classified as to size positionally transversely of the table. That is, as the bed of materials progresses gradually forwardly along the table, undergoing stratification and separation, in the upper stratum of clean coal the larger pieces gradually travel to the upper side edge of the table, and then travel forwardly to discharge at the forward end of the table. The pieces of coal of next largest dimension gradually work to a position in the upper stratum of coal just within the aforesaid largest pieces, and travel forwardly in the bed to discharge at the forward end of the table, and so on across the table, the size of the coal in the upper, clean stratum decreasing transversely and gradually toward the lower side edge of the table and of the bed. Thus, the upper stratum of coal is discharged in pure or clean condition at the forward end of the table, and also in classified condition as to size. By taking off or dividing the spillage edge of the table into a series of channels, the number and positions of which may be varied as desired, the clean coal may be taken off in practically any desired number of different sizes with a very clear line of demarkation between the sizes.

Thus, by our invention not only do we obviate the extensive work and mechanism of previous sizing as an essential preliminary to the cleaning or separating of the coal, but in addition to attaining the advantage of thoroughly cleaning unsized coal, we effect an automatic sizing of the clean coal resulting from our single operation and can deliver it in closely classified sizes, varying in number and size range as desired.

Figure 15:
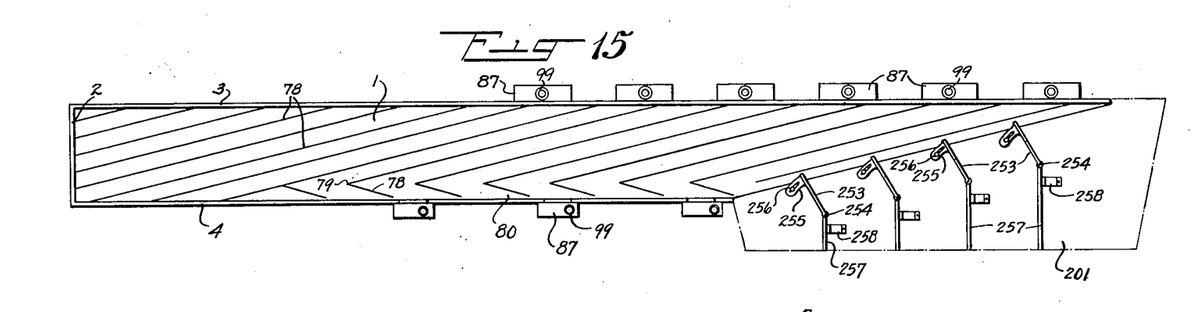
Fig. 15 is a diagrammatic plan showing concurrent cleaning and sizing.

For the purpose of classifying the clean coal, there is shown in Fig. 15, a plurality of separating or size classifying plates 253 which are vertically disposed, and are pivotally mounted at 254 upon the discharge plate 201. The plates 253 may be positioned angularly to regulate the exact size or classification for each plate, and for this purpose each of the separating plates 253 is provided with a transversely-extending bottom flange 255, having a bolt and slot connection 256, whereby the separating plate may be angularly positioned and then firmly held in position. Side channel plates 257 extend forwardly along the spillage plate 201, and are held in place in any suitable manner, as by brackets 258. The clean coal flowing from the various channels will be taken off separately, to preserve the size classification, or, alternatively, by merely discharging the different channels into a single conveyor or receptacle the clean coal may be taken off as an unsized product.

From the foregoing, it will be understood that a process and a mechanism for practicing the same has been provided realizing the objects and advantages set forth, together with other objects and advantages; and that departures may be made from the precise manner of carrying out the process, and from the details of structure of the mechanism, without departing from the principles of the invention and without sacrificing its chief advantages.

What we claim is:—

1. The process of separating intermixed divided materials varying relatively greatly in size, but varying relatively little in their specific gravities, which comprises maintaining a bed of the materials of substantial thickness in continuous progression over an air-pervious table, forcing gradated lifting air currents through the forwardly moving bed to separate a superior flotant stratum of lighter material and to cause a heavier material to settle on the table by gravity, and impelling the finer settled heavier material to discharge at one side of the bed and the coarser settled heavier material to discharge at the opposite side of the bed.

2. The process of separating intermixed divided materials varying relatively greatly in size, but varying relatively little in their specific gravities, which comprises maintaining a bed of the materials of substantial thickness in continuous progression over an air-pervious table, forcing gradated lifting air currents through the forwardly moving bed to separate a superior flotant stratum of lighter material and to cause a heavier material to settle on the table by gravity, and to direct the finer settled heavier material to discharge at one side of the bed and the coarser settled heavier material to discharge at the opposite side of the bed.

3. The process of separating intermixed divided materials varying relatively greatly in size, but varying relatively little in their specific gravities, which comprises maintaining a bed of the materials of substantial thickness in continuous progression over an air-pervious table, forcing gradated lifting air currents through the forwardly moving bed to separate a superior flotant stratum of lighter material and to cause a meavier material to settle on the table by gravity, and impelling the finer settled heavier material to discharge at one side of the bed and the coarser settled heavier material to discharge at median points along the opposite side of the bed.

4. The process of separating intermixed divided materials varying relatively greatly in size, but varying relatively little in their specific gravities which comprises maintaining a bed of the materials of substantial thickness in continuous progression over an air-pervious table, forcing gradated lifting air currents through the forwardly moving bed to separate a superior flotant stratum of lighter material and to cause a heavier material to settle on the table by gravity, and impelling the finer settled heavier material to discharge at one side of the bed and the coarser settled heavier material to discharge at the opposite side of the bed and directing a flotant stratum of lighter material forwardly to discharge at the front of the bed.

5. The process of separating intermixed divided materials varying relatively greatly in size, but varying relatively little in their specific gravities, which comprises maintaining on a transversely inclined air-pervious table a bed of the materials undergoing stratification, the heavier material settling upon the table, and discharging the settled heavier material both at the upper and lower side edges of the bed and directing a flotant stratum of lighter material forwardly to discharge at the front of the bed.

6. The process of separating intermixed divided materials varying relatively greatly in size, but varying relatively little in their specific gravities, which comprises maintaining on a transversely inclined air-pervious table a bed of the materials undergoing stratification, the heavier material settling upon the table, and discharging the finer settled heavier material at one side of the bed and the coarser settled heavier material at the opposite side of the bed and directing a flotant stratum of lighter material forwardly to discharge at the front end of the bed.

7. A mechanism for separating intermixed divided materials varying relatively greatly in size but varying relatively little in their specific gravities including in combination an air-pervious deck, means for feeding the intermixed materials thereto, devices for stratifying and separating the intermixed materials including means for longitudinally reciprocating the table, means for forcing air currents through the bed, and means for impelling the coarser settled heavier material to discharge at one side of the bed and the finer settled heavier material to discharge at the other side of the bed.

8. A mechanism for separating intermixed divided materials varying relatively greatly in size but varying relatively little in their specific gravities including in combination an air-pervious transversely-inclined deck, means for feeding the intermixed materials thereto, devices for stratifying and separating the intermixed materials including means for longitudinally reciprocating the table, means for forcing air currents through the bed, and means for impelling the coarser settled heavier material to discharge at the upper side of the bed and the finer settled heavier material to discharge at the lower side of the bed.

9. A mechanism for separating intermixed divided materials varying relatively greatly in size but varying relatively little in their specific gravities including in combination an air-pervious transversely-inclined deck, means for feeding the intermixed materials thereto, devices for stratifying and separating the intermixed materials including means for longitudinally reciprocating the table, means for forcing air currents through the bed, and means for impelling the coarser settled heavier material to discharge at the upper side of the bed and the finer settled heavier material to discharge at the lower side of the bed and means for discharging a forwardly moving superior stratum of lighter material at the front end of the table.

10. A mechanism for separating intermixed divided materials varying relatively greatly in size but varying relatively little in their specific gravities including in combination an air-pervious deck, separating partitions on the deck forwardly and outwardly inclined toward both side edges of the deck from a common point which is nearer to one of the side edges of the deck.

11. A mechanism for separating intermixed divided materials varying relatively greatly in size but varying relatively little in their specific gravities including in combination an air-pervious deck, separating partitions on the deck forwardly and outwardly inclined toward both side edges of the deck from a common point which is nearer to one of the side edges of the deck and means for discharging a settled heavier material from points on the side edges of the deck.

12. A mechanism for separating intermixed divided materials varying relatively greatly in size but varying relatively little in their specific gravities including in combination an air-pervious deck, separating partitions on the deck forwardly and outwardly inclined toward both side edges of the deck from a common point which is nearer to one of the side edges of the deck and means for discharging a superior flotant stratum of material at the front end of the table.

13. A mechanism for separating intermixed divided materials varying relatively greatly in size but varying relatively little in their specific gravities including in combination an air-pervious deck, separating partitions on the deck forwardly and outwardly inclined toward both side edges of the deck from a common point which is nearer to one of the side edges of the deck and a transverse spillage edge for discharging a superior flotant stratum of material at the front end of the table.

14. A mechanism for separating intermixed divided materials varying relatively greatly in size but varying relatively little in their specific gravities including in combination a transversely-inclined air-pervious deck, separating partitions on the deck forwardly and outwardly inclined from a common point which is nearer the lower side edge of the table.

15. A mechanism for separating intermixed divided materials varying relatively greatly in size but varying relatively little in their specific gravities including in combinaton an air-pervious deck, separating partitions on the deck forwardly and outwardly inclined toward both side edges of the deck from a common point, the deck having an area of relatively low air perviosity along one set of separating partitions.

16. A mechanism for separating intermixed divided materials varying relatively greatly in size but varying relatively little in their specific gravities including in combination an air-pervious deck, separating partitions on the deck forwardly and outwardly inclined toward both side edges of the deck from a common point which is nearer to one of the side edges of the deck, the deck having an area of relatively low air perviosity along the shorter separating partitions.

17. The process of separating intermixed divided materials varying relatively greatly in size which comprises maintaining a continuous, traveling and substantially thick bed of said material which is inclined transversely, vibrating the bed and passing lifting and loosening air currents therethrough, progressing a flotant stratum of lighter material forwardly to discharge, impelling settled heavier material transversely of the lighter material and upwardly to discharge, and concurrently classifying the lighter material according to size by arranging the larger pieces thereof along the upper side of the bed and the finer particles along the lower side.

18. The process of separating intermixed divided materials of different sizes and different specific gravities, such as a mixture of coal and heavier impurities which comprises first separating the mixture by means of air at relatively high pressure whilst it is being moved mechanically into two parts, one consisting of the larger particles of the heavier component, and then submitting the remainder to a screening process for the removal of the larger particles of the lighter component in substantially pure form, and further treating the smaller particles of the lighter material and the smaller particles of the heavier material to a second pneumatic separating action at a lower air pressure.

19. The process of purifying coal which comprises maintaining a substantial bed of raw coal containing relatively large pieces and fine particles in intermixture, subjecting said bed to the separating action of lifting and loosening air currents and mechanical vibration to stratify the bed, controlling the separating forces to effect a relatively early and complete stratification of the coarser pieces of refuse, discharging said coarse refuse pieces from the bed as a final refuse product, discharging the flotant stratum of coal from the bed, screening said coal, delivering the larger pieces of the screened coal as a final coal product, and subjecting the fine material which passes through the screen to a second pneumatic separating action to separate residual fine refuse therefrom.

20. The process of purifying coal which comprises maintaining a substantial bed of raw coal containing relatively large pieces and fine particles in intermixture, subjecting said bed to the separating action of lifting and loosening air currents at a relativley high pressure and mechanical vibration to stratify the bed, controlling the separating forces to effect a relatively early and complete stratification of the coarser pieces of refuse, discharging said coarse refuse pieces from the bed as a final refuse product, discharging the flotant stratum of coal from the bed, screening said coal, delivering the larger pieces of the screened coal as a final coal product, and subjecting the fine material which passes through the screen to a second pneumatic separating action at a lower air pressure to separate residual fine refuse therefrom.

21. The process of purifying raw coal containing relatively coarse pieces and fine particles which comprises maintaining a forwardly-progressing bed of said raw coal, subjecting the bed to vibration and regulated air currents to stratify the bed and separate the coarse heavy material from the bed, delivering said coarse impurities as a final product, separately delivering the coarse coal by screening the fine particles therefrom, subjecting the intermixed fines to further separating air action and separately delivering the fine impurities and the fine coal.

22. The process for the separation of dry materials, for instance, a mixture containing two substances of different density, and in particles of different sizes, for example a mixture of coal and a heavier material, which consists in first separating the mixture by a dry pneumatic stratification separation process into at least two parts, one consisting of the larger particles of the heavier component, then submitting the remainder to a screening process for the removal of the larger particles of the lighter component of the mixture in substantially pure form, and submitting the remainder comprising the smaller particles of the lighter material, and the smaller particles of the heavier material to a pneumatic stratification separation process.

23. The process of purifying raw coal containing relatively coarse pieces and fine particles which comprises maintaining a forwardly progressing and substantially deep bed of said impure raw coal, vibrating and passing air through substantially all parts of the bed, controlling the air action to effect stratification and separation of substantially all the coarser impurities and a portion of the fine impurities, separately discharging the coal and the fine impurities remaining intermixed therewith, screening and removing the coarse coal as a purified product, and separating and separately delivering the fine coal and remaining fine impurities by subjecting said materials to a second pneumatic separating action.

24. The process of purifying coal which comprises maintaining a substantial bed of raw coal containing relatively large pieces and fine particles in intermixture, subjecting said bed to a pneumatic stratification action to stratify the bed, controlling the separating forces to effect a relatively early and complete stratification of the coarser pieces of refuse, discharging said coarse refuse pieces from the bed as a refuse product, discharging the flotant stratum of coal from the bed, screening said coal, delivering the larger pieces of the screened coal as a coal product, and subjecting the fine material which passes through the screen to a second pneumatic separating action to separate residual fine refuse therefrom.

25. A mechanism for purifying coal, including in combination a primary pneumatic stratification separator, means for feeding thereto and maintaining thereon a bed of raw coal containing relatively large pieces and fine particles in intermixture, means for subjecting the bed to a primary pneumatic stratifying and separating action, means for delivering coarser settled heavy material from the bed as a refuse product, means for delivering together from the bed the coal and fine heavier material remaining in intermixture, screening means for said intermixed coal and fine heavier material, means for delivering the coarser product of the screening means as a clean coal product, a second pneumatic stratification separator and means for feeding the intermixed fine coal and refuse passing through said screening means to said second separator for a second pneumatic stratification separating action.

26. A process of separating intermixed divided materials varying relatively greatly in size, such as unsized raw coal, which comprises maintaining a bed of the materials in continuous progression along a transversely-inclined air-pervious table, subjecting the bed to the pneumatic-stratification effect of rising air under pressure and thereby forming a superior flotant stratum of lighter material and causing the heavier material to settle to the table, the finer components of the heavier material settling relatively near the lower side edge of the bed discharging the flotant stratum of coal, and discharging the settled heavier material as refuse by guiding the relatively finer material which settles relatively near the lower side edge of the bed toward said lower side to discharge and guiding the other settled heavier material to discharge at the upper side edge.

KENNETH DAVIS.
RICHARD PEALE.